US011951767B2

(12) United States Patent
Vest

(10) Patent No.: US 11,951,767 B2
(45) Date of Patent: Apr. 9, 2024

(54) METHOD AND SYSTEM FOR MAKING ARTWORK USING PAINTING GLOBULES

(71) Applicant: Lukas C. Vest, Denver, CO (US)

(72) Inventor: Lukas C. Vest, Denver, CO (US)

( * ) Notice: Subject to any disclaimer, the term of this patent is extended or adjusted under 35 U.S.C. 154(b) by 864 days.

(21) Appl. No.: 16/993,227

(22) Filed: Aug. 13, 2020

(65) Prior Publication Data

US 2021/0268831 A1 Sep. 2, 2021

Related U.S. Application Data

(60) Provisional application No. 62/984,257, filed on Mar. 2, 2020.

(51) Int. Cl.
*B44D 5/00* (2006.01)
*B44D 3/02* (2006.01)

(52) U.S. Cl.
CPC ................. *B44D 5/00* (2013.01); *B44D 3/02* (2013.01)

(58) Field of Classification Search
None
See application file for complete search history.

(56) References Cited

U.S. PATENT DOCUMENTS

| | | | | |
|---|---|---|---|---|
| RE26,948 E | | 9/1970 | Klein | |
| 9,085,195 B2 | | 7/2015 | Mesaros | |
| 2004/0018315 A1 | * | 1/2004 | Janssen | B05D 5/06 427/256 |

FOREIGN PATENT DOCUMENTS

| | | |
|---|---|---|
| KR | 20100124244 A | 11/2010 |
| WO | 2007129338 A1 | 11/2007 |

OTHER PUBLICATIONS

"Creating Impastos in Oil Painting," https://www.youtube.com/watch?v=IzqbBOIVJ6A [date accessed: Dec. 16, 2019].

* cited by examiner

*Primary Examiner* — Alexander M Weddle
(74) *Attorney, Agent, or Firm* — Bold IP, PLLC; Houda El-Jarrah

(57) ABSTRACT

A method for creating three-dimensional artwork that incorporates dry or wet painting globules. The painting globules are formed from a mixture of oil paint, gel painting medium, and resin glaze medium. The painting globules are formed and rolled into three-dimensional, spherical shapes that can be deposited on a canvas or other surface to form the artwork. The painting globules can be deposited when still wet or when dry so that their position and placement can be manipulated by the artist. The painting globules can be pre-rolled and included in a kit that includes several painting globules having a number of sizes and colors.

6 Claims, 7 Drawing Sheets

METHOD AND SYSTEM FOR MAKING ARTWORK USING PAINTING GLOBULES

CROSS-REFERENCE TO RELATED APPLICATIONS

This application is a non-provisional application which claims priority to U.S. Provisional Patent Application No. 62/984,257 filed on Mar. 2, 2020, which is incorporated by reference in its entirety.

FIELD OF THE DISCLOSURE

The present invention relates to a new method and system for painting and creating artistic pieces. More specifically, the present invention relates to a reproducible method for applying painting globules to a canvas or other adherable surface to create unique pieces of artwork that have heightened three-dimensionality and visual appeal.

BACKGROUND

Throughout human history, painting has been a popular form of human expression. Certain techniques have been used to add a greater sense of three-dimensionality and texture to a painting piece. For example, impasto is a well-known technique used in painting in which paint is laid on an area of the painting surface in very thick layers, usually thick enough that the brush or painting-knife strokes are visible. Paint can also be mixed directly on the canvas. When dry, impasto provides more texture to a painting than the typical two-dimensional painting. Impasto still requires the artist to use brushstrokes to create a scene or piece of art on a canvas or other surface.

Another technique has been a hallmark of aboriginal art and is known as dot art, which is a technique characterized by blotching acrylic or alkyd paint using a loaded paint-brush, paint dispenser, or embossing stylus of graduated sizes on a flat horizontal surface. The artwork that uses dot art is characterized by having many raised dots on its surface, whereby the dots are somewhat pointed or rounded and somewhat raised from the surface. Similarly, blob art involves the application of paint (usually acrylic paint) in rounded forms or blobs. Oftentimes, the blobs are allowed to dry and then additional blobs placed over them. However, neither the impasto technique nor the dot art or blob art techniques involve the use of paint as individually, rolled globules that can be separately rolled and placed on a canvas. In fact, these techniques do not allow the painted blob or dot to be rolled into a spherical round shape. Rather, they just provided minimal texture and rounded appearance on the canvas or other support surface.

Another drawback when creating dot art or blob art is that the canvas or other support surface must be horizontal and/or a level, flat surface. If the canvas or other support surface is left in vertical, upright position, the liquid paint will drip in an unwanted manner and the colors of the paint will bleed or run greatly. Accordingly, none of these existing painting techniques are capable of providing the overall effect of spherical painting globules that may be applied either as wet painted globules or as dry painted globules to achieve a unique visual effect and create unique pieces of art.

SUMMARY

In one or more embodiments, a method is disclosed in the present description for creating artwork made from one or more three-dimensional painting globules. In a first method, the one or more painting globules may be applied to a canvas or other adherable type of surface when dry. The method may include mixing oil paint, gel painting medium, and a resin glaze medium to create a mixture for forming the one or more painting globules. The method may further include removing from the mixture a desired amount to form the one or more painting globules and then forming the one or more painting globules. The painting globules may be formed by rolling the desired amount of the mixture into the painting globules on a paint palette or other mixing surface, whereby each painting globule of the painting globules has a generally rounded, spherical shape having a desired size and texture. Next, the method may continue with allowing the one or more painting globules a sufficient amount of time to dry in order for at least an outside layer of the one or more painting globules to become dry. Subsequently, a miniscule amount of paint may be deposited on the canvas or other adherable surface on which the artwork is to be created. The process may continue by adhering the one or more painting globules to the canvas or other adherable surface by applying a first painting globule onto the deposited minuscule amount of paint. The deposited paint may act like a glue or adhesive to hold the first painting globule down on the canvas. In order to complete the artwork, the artist may continue depositing a miniscule amount of paint and to individually apply each remaining painting globule to the canvas or other adherable surface in a desired pattern and order to create the artwork. After all of the painting globules have been applied to the canvas or other adherable surface, the user may allow the canvas or other adherable surface a sufficient period of time for the one or more painting globules to fully dry including their inner layers. In this manner, artwork may be created using pre-formed, painting globules that are at least dry to the touch using a first technique from the globulism method.

In another embodiment, the present description may include a method for creating artwork using one or more painting globules and applying the one or more painting globules when the one or more painting globules are still wet. This exemplary method may include mixing oil paint, gel painting medium, and a resin glaze medium on a paint palette or other mixing surface to create a mixture for forming the one or more painting globules. The method may include removing from the mixture a desired amount to form into the one or more painting globules. The one or painting globules may be formed by rolling the desired amount of the mixture into the one or more painting globules on the paint palette or other mixing surface. Each painting globule of the one or more painting globules may be formed having a generally rounded, spherical shape having a desired size and texture. Each painting globule may be individually applied to the canvas or other adherable surface while the one or more outer layers of the painting globules are still wet. The painting globules may be applied in a desired order and arrangement of colors and sizes directly to a canvas or other surface to create the artwork. The method may further include allowing the canvas or other surface a period of time for the one or more painting globules to fully dry. This method may be a second technique for creating artwork using painting globules and the globulism method.

In another embodiment, the present description includes a kit having a plurality of painting globules. An exemplary kit may include a container and a plurality of painting globules located in the container, whereby the plurality of painting globules has already been mixed, rolled, and allowed to dry. Accordingly, the plurality of painting globules located in the kit are pre-formed into generally rounded, spherical type globules, and may include painting globules having a variety of colors and sizes. The painting globules in the kit are configured to be removed and applied to a canvas or other surface to create artwork that includes the painting globules.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
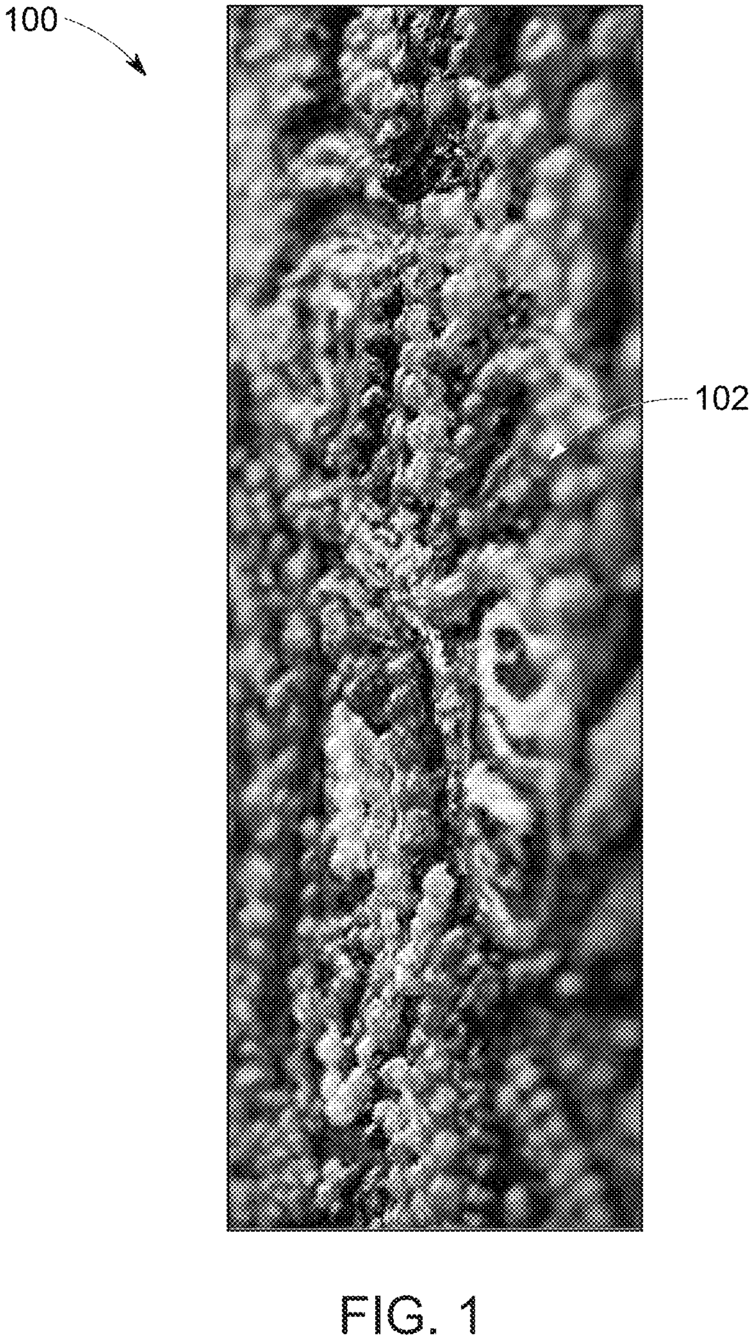
FIG. 1 is a pictorial illustration of a portion of an existing piece of artwork created using the globulism method in accordance with an illustrative embodiment.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The present disclosure is generally drawn to various embodiments for a system and method for a new painting technique known as globulism. Globulism is a unique painting technique created by the inventor associated with the present description. Notably, "globulism" or "globulist" are also unique terms coined and created by the inventor associated with the present description. Globulism refers to the use of individually, rolled, physical spheres, referred to herein as "painting globules" to create artwork. Globulism involves the creation of textured, thick, spheres made from the combination of paint (e.g. oil paint), gel painting medium (e.g. turpenoid gel or another impasto gel), and resin glaze medium. The painting globules have a defined, generally rounded or spherical form. Globulism does not require the use of brush strokes on a canvas to create the painting globules, which may make the process user friendly for novice painters, as artwork may be created by the individual application of the generally spherical shaped painting globules. Once the artist has completed the painting or other artistic piece, the effect as a whole is very appealing to the viewer, which is in part due to the use of the circular, spherical painted globules that are clearly visible on the canvas or other type of surface the artwork is created upon. This may be because spheres and rounded forms are a type of shape that instantly provide more comfort to the viewer and attract the viewer to look in the direction of the rounded form as taught by psychologists and based on other studies.

Advantageously, the painted globules, as described in one or more non-limiting embodiments below, may be applied using the techniques described in a controlled and reproducible manner in order to complete a painting or other type of art. Additional details for the one or more embodiments of the present invention are provided below with respect to the drawings that illustrate the one or more embodiments and their method of use.

FIG. 1 is a pictorial illustration of a portion of artwork that was created using one or more elements of the globulist technique, as will be explained further below. Globulism is the use of several painting globules (e.g. also referred to herein as "globs") that have been arranged and attached to either a canvas or other adherable surface in order to create pieces of artwork. For example, the globulist painting 100 shown in FIG. 1 involves the application of several hundred painting globules 102 that are arranged in a desired pattern and order so as to create a piece of artwork appealable to the artist and to viewers. Globulism is unique in that it provides a controlled, consistently reproducible painting technique in which varying and/or uniform sizes of rounded paint globules are individually applied to an adherable surface. If a viewer approaches the globulist painting 100 and looks closely, he or she can see the several hundred painting globules 102 used to create a complete composition or artwork which has a stunning visual effect to the viewer who may then proceed to further closely examine each portion of the artwork to better understand the combination of colors and sizes and forms associated with the specific selection of painting globules, such as painting globules 102, as arranged on the canvas.

Figure 2:
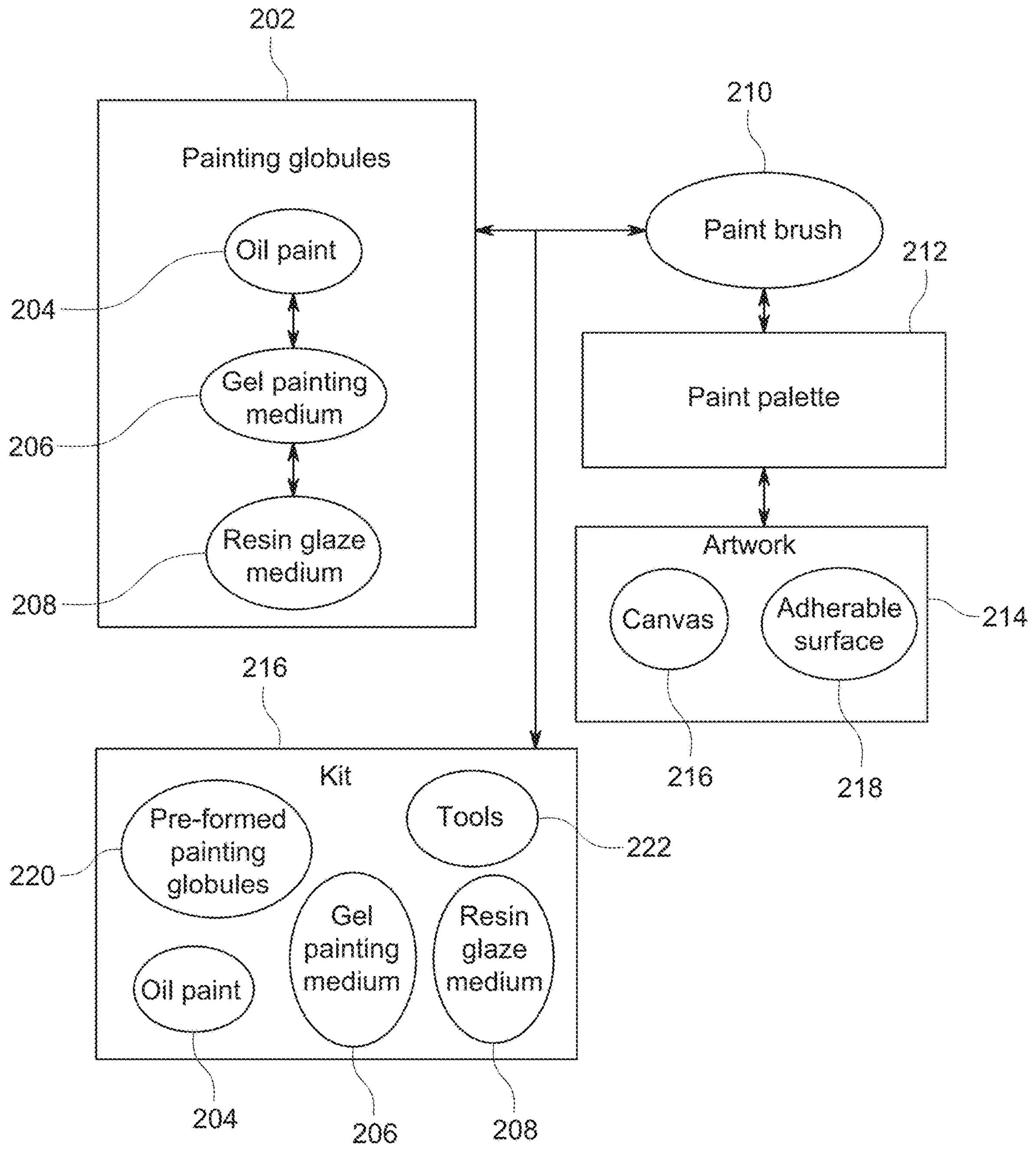
FIG. 2 is a block diagram of one or more components used to create and apply painting globules in accordance with an illustrative embodiment.

FIG. 2 is a block diagram that illustrates one or more components used to form painting globules, such as painting globules 202, and the various uses and applications of such painting globules. Painting globules 202 as discussed with relation to FIG. 2 may be in accordance and the same as the painting globules 102 shown in the globulist painting in FIG. 1.

In one or more non-limiting embodiment, painting globules 202 are somewhat rounded paint globules having a generally spherical shape. It is noted that the term "painting globules" may be interchangeably used or referred to herein also as a "globule" or "glob" or "paint glob." Painting globules 202, in one or more non-limiting embodiments, are globules that are a result of the mixture of oil paint 204, gel painting medium 206, and resin glaze medium 208. Oil paint 204 may be any type of oil paint as known in the art and may be chosen from any manufacturer and having any color. It is noted that, in other embodiments, painting globules 202 may also be created using other types of paint, including without limitation, acrylic paint, latex paint, or any other type of paint.

In a preferred embodiment, the gel painting medium 206 may be turpenoid gel. Turpenoid gel is a fast-drying medium that increases the transparency of oil colors and can help to create an added layer of three-dimensionality when used with paint to provide texture and height to a paint stroke. Further, as sold in its original container, it is a clear, semi-soft gel that is usually smooth and very flexible. Turpenoid gel functions to shorten the drying time of paint and allows the paint to dry much quicker. Further, turpenoid gel may assist in making opaque colors more transparent while also offering glazing effects while adding brilliance and luminosity.

It has been the experience of the inventor of the presently described embodiments that turpenoid gel may be preferable because turpenoid gel assists in providing the highest viscosity with the combination of oil paint 204 and resin glaze medium 208 and the gel painting medium 206 (e.g. turpenoid gel). In general, it is potentially feasible for any kind of impasto gel to be used for the gel painting medium 206, however, as noted above, the use of turpenoid gel has been found to produce higher quality and the desired effect. It may also be possible to use "galkyd gel," also known as "G-Gel," which is a gelled alkyd resin painting medium. After much testing and inventive effort, it has been found that galkyd gel may be runnier than turpenoid gel, which is why turpenoid gel may be preferable to provide a better viscosity and thickness to the finalized painting globule 202. However, as noted above, other types of gel painting mediums 206 other than turpenoid gel are usable to form the painting globules 202 in one or more alternative embodiments.

Resin glaze medium 208 is also a component or ingredient used to form a painting globule 202. In one or more non-limiting embodiments, it may be preferable for the resin glaze medium 208 to be a balsam resin glaze medium. The balsam resin glaze medium is a known glaze medium that is based on Austrian larch turpentine and fused with dammar resin and linseed stand oil. Balsam resin glaze medium 208 provides painting globules 202 with increased gloss levels and imparts depth to the overall paint film of the painting globules 202.

In one or more non-limiting embodiments, a paint palette, such as paint palette 212 is any type of surface on which the oil paint 204, gel painting medium 206, and resin glaze medium 208 may be mixed together to form one or more painting globules 202. Paint palette 212 may have any size and may be made of any type of material known in the art. Further, another type of object or surface other than a paint palette 212 may alternatively be used to mix oil paint 204, gel painting medium 206, and resin glaze medium 208 into one or more painting globules 202.

To mix the oil paint 204, gel painting medium 206, and resin glaze medium 208 together, it is recommended to use a paint brush, such as paint brush 210. Paint brush 210 may be any type of paint brush known in the art. Notwithstanding, it has been found with repeated testing and replication of the process used to create one or more painting globules 202, that a #6 Filbert® oil brush is recommended to thoroughly pick up the desired amount of each of the oil paint 204, gel painting medium 206, and resin glaze medium 208. It is also noted that other tools or items may be used to mix oil paint 204, gel painting medium 206, and resin glaze medium 208 together other than paint brush 210 or other than the type of paint brush 210 described above. For example, it may be feasible to use a pointing tool or stick or any other type of tool, without limitation, to mix these components together. Further, the user may choose to use his or her hands to form the painting globules 202. As explained further below, painting globules 202, when mixed and dried, may be individually held and moved around as desired by the artist, whether the artist uses tools, such as paint brush 210, one's hand, or another type of tool.

To form painting globules 202, oil paint 204, gel painting medium 206, and resin glaze medium 208 have to be mixed together thoroughly together. In one preferred embodiment, these components are combined in a three (3) to one (1) to one-half (½) ratio of the oil paint 204, gel painting medium 206, and resin glaze medium 208, respectively. Accordingly, the oil paint 204 is provided in the greatest amount of three parts to one part of gel painting medium 206 and one-half part of the resin glaze medium 208. It has been found, after much testing and experimentation, that this ratio may provide the best viscosity and consistency for the painting globules 204 to have the proper form and texture. The gel painting medium 206 (e.g. turpenoid gel in one or more embodiments) assists in allowing the painting globules 202 to become dry enough to the touch such that the colors will not bleed and run to a great extent and the painting globules 202 become a solid piece that may be held and manipulated into position on a canvas (e.g. canvas 216) or other surface (e.g. adherable surface 218) as desired. Other amounts of the components may be also be used in alternative embodiments of the mixture.

Accordingly, the artist selects the appropriate amount of oil paint 204, gel painting medium 206, and resin glaze medium 208 and combines the three together for mixing on a paint palette 212 or other type of mixing surface. The artist is recommended to use a paint brush (e.g. 210) and mix the selected amounts of oil paint 204, gel painting medium 206, and resin glaze medium 208.

Once the components have been mixed together, the artist (or other entity) may begin to form the painting globules 202. If the artist or user is using a paint brush such as paint brush 210, the artist begins by moving paint brush 210 smoothly across the surface of the paint palette 212 (or other mixing surface) towards the unrolled mixture in a scooping motion, and directly upon contact with the mixture of these components (e.g. oil paint 204, gel painting medium 206, and resin glaze medium 208), the artist may roll the paint-brush approximately 90 degrees clockwise and lift the resulting paint globule 202 off the surface of the paint palette 212 and onto the bristles of the paint brush 210. This scooping and rolling action with the paint brush 210 has been shown to produce a generally rounded, spherical glob that is a combination of a ratio of the oil paint 204, gel painting medium 206, and resin glaze medium 208 (e.g. 3 parts oil paint 204 to 1 part of the gel painting medium 206 to ½ part of the resin glaze medium 208). If the artist determines that the resulting paint globule 202 requires more rounding or would like it to have a larger size, the artist may set the paint globule 202 back on the surface of the paint palette 212 with the paint brush 210 and then with a reverse, counter clockwise motion push the paint glob along the surface of the paint palette 212 in order to round out the overall shape of the paint globule even more or to adjust its size. As noted above, an artist is not limited to using a paintbrush, such as paintbrush 210. It may also be useful to use one's fingers or any other desired tool.

Figure 5:
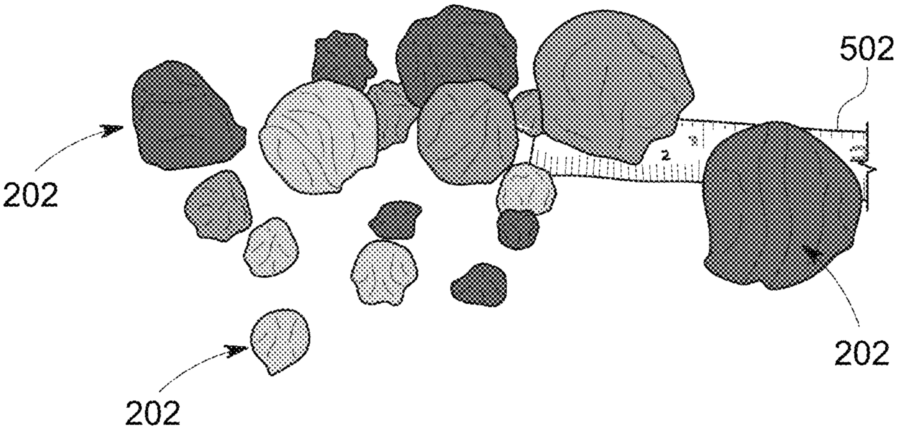
FIG. 5 is a pictorial illustration of painting globules of various sizes and colors in accordance with an illustrative embodiment.
Figure 6:
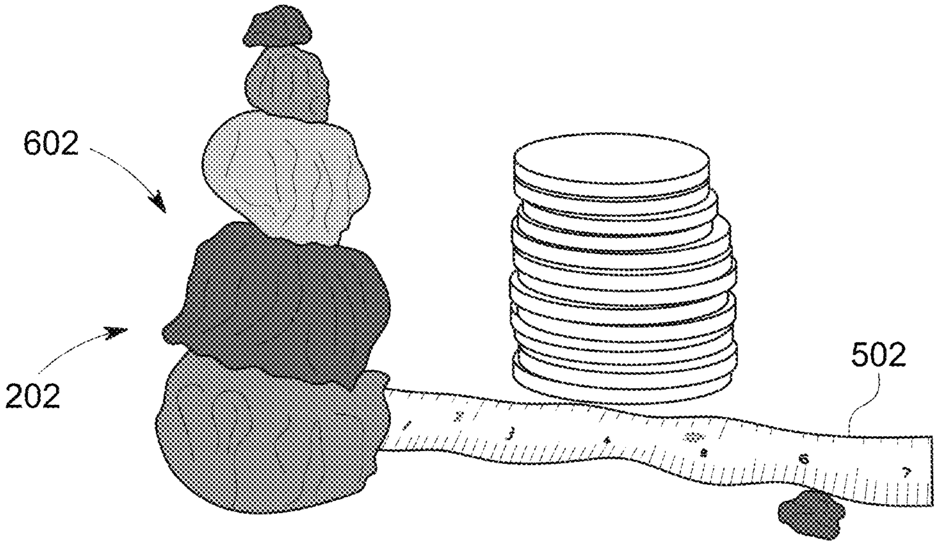
FIG. 6 is a pictorial illustration of a stack of painting globules of various sizes and colors in accordance with an illustrative embodiment.

The artist may continue to roll out the desired number of paint globules 202 using any desired color of oil paint 204 as mixed with the gel painting medium 206 and resin glaze medium 208. The artist may use any color of oil paint 204 as desired to create the paint globules 202 that will best suit the piece of artwork, such as artwork 214, that the artist is trying to create. FIG. 5 and FIG. 6 illustrate examples of dried painting globules 202 that have been rolled and formed using the methods described above. As shown in FIG. 5 and FIG. 6, painting globules 202 may be rolled having a range of sizes from very small to a larger sized globule. Further, the painting globules 202 may have an uneven overall texture with various indentations and grooves on their outer surface (e.g. as shown in FIG. 5 and FIG. 6) or they may be made to appear more symmetrical and rounded in shape. The artist is provided with room for his or her creativity to determine the overall look and shape of the one or more painting globule 202.

In one or more embodiments, the artist may use the created painting globules 202 to arrange into any artistic design and pattern on canvas 216 as a painting or other type of artwork 214. It is noted that painting globules 202 may be used to create any type of artwork 214 on any type of adherable surface 218 without limitation to a canvas, such as canvas 216. Such adherable surfaces 218 may include pottery, furniture, glassware, wall surfaces, or any type of manmade or natural surface to which the painting globules 202 may be adhered. The artwork 214 may vary in size from very small to very large, extensive pieces.

Figure 3:
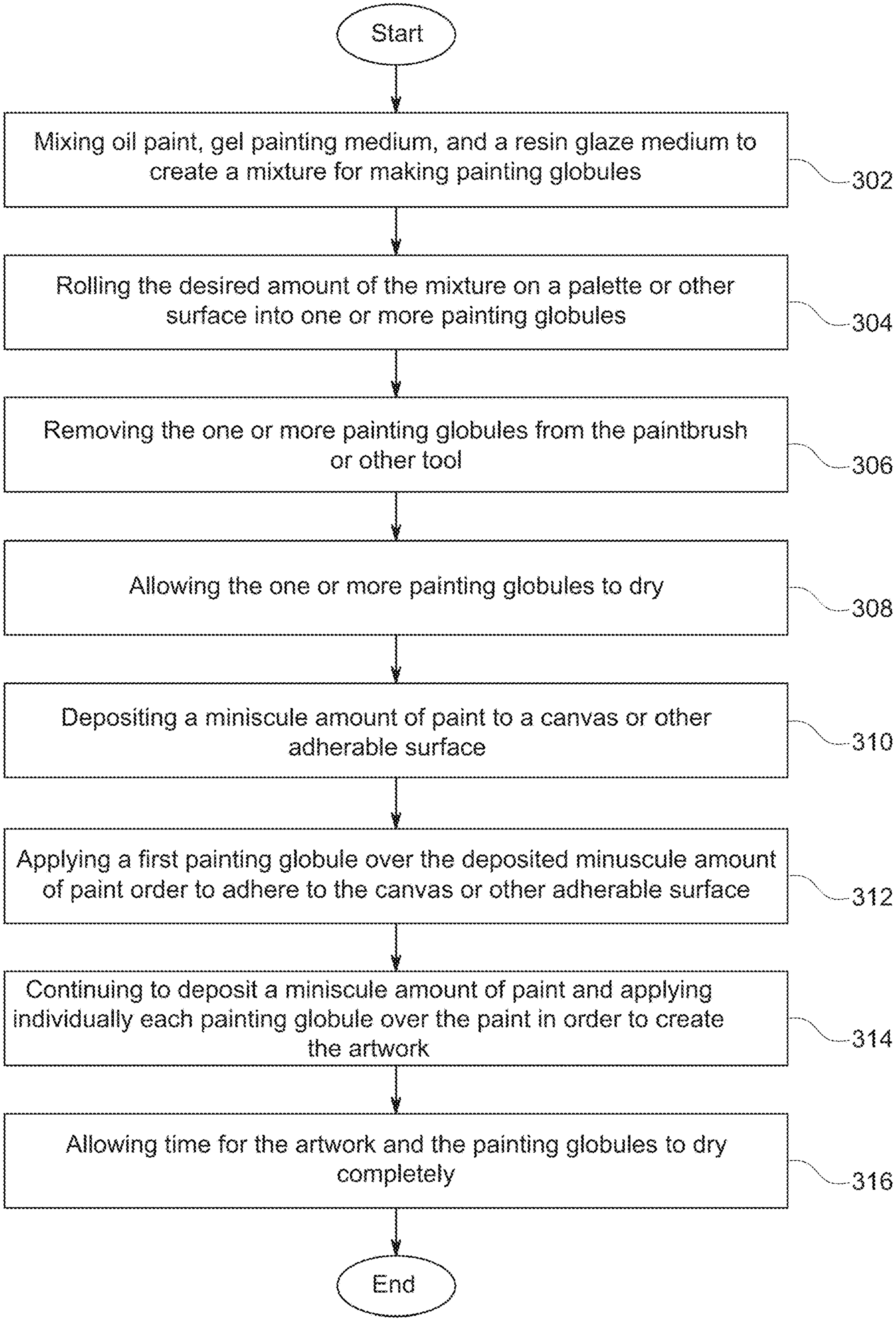
FIG. 3 is a flowchart of an exemplary process for creating artwork using painting globules that may be applied to a surface after having been left to dry (i.e. dry rolling) in accordance with an illustrative embodiment.
Figure 4:
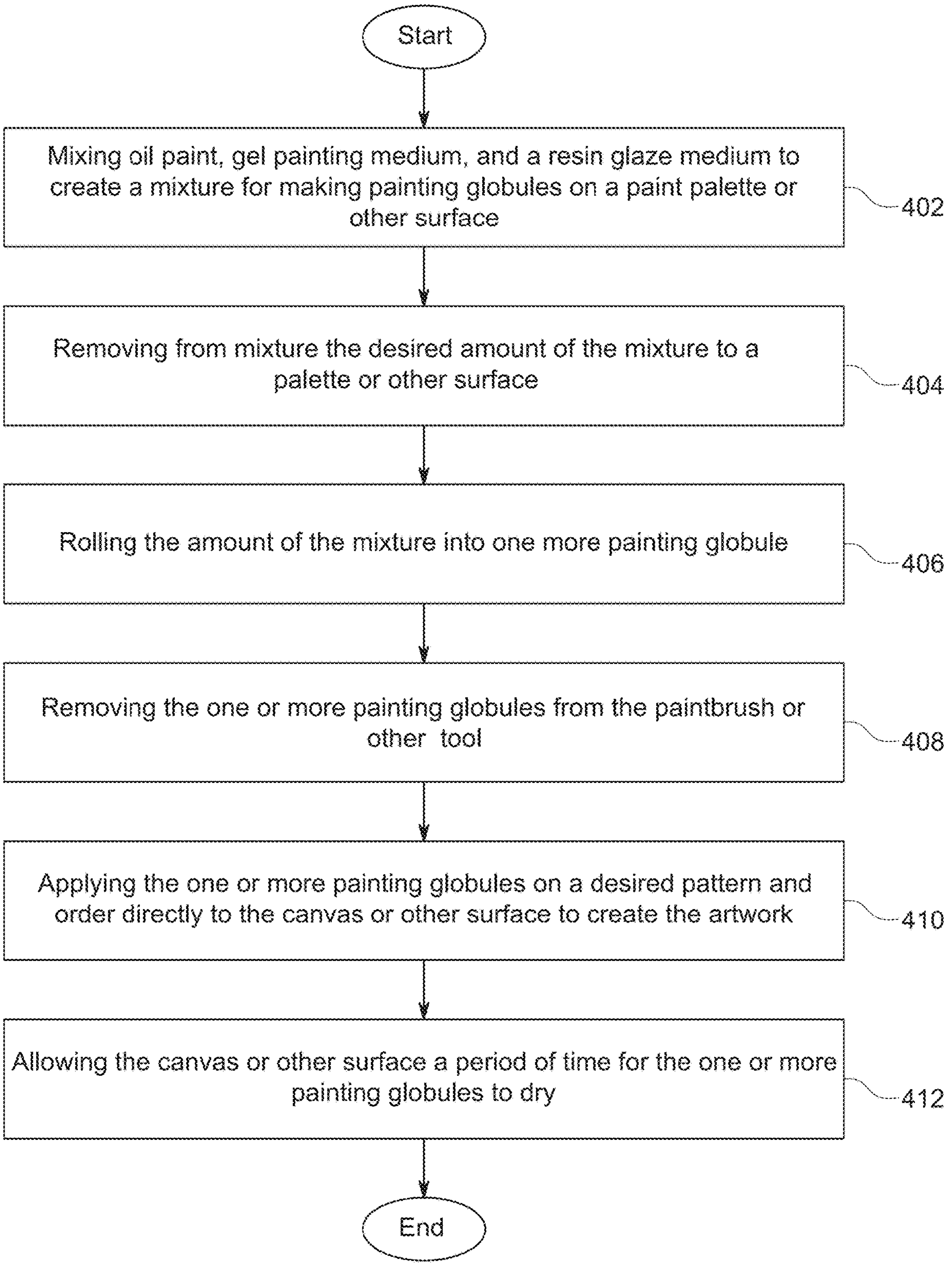
FIG. 4 is a flowchart of an exemplary process for creating artwork using painting globules that may be applied to a surface when still wet (i.e. wet rolling) in accordance with an illustrative embodiment.

There are two recommended processes for adhering the painting globules 202. FIGS. 3 and 4 illustrate one or more exemplary processes for adhering the painting globules 202 to either a canvas 216 or other adherable surface 218 and will be described in more detail below. The first process that has been developed by the inventor is "dry rolling" in which the painting globules are applied to a canvas or other surface after having some time for an outer layer of the painting globules 202 to dry after having been rolled and formed. The process of applying the painting globules 202 using dry rolling is illustrated in the flowchart shown and described in FIG. 3. The second process that has been developed by the inventor is "wet rolling" in which the formed painting globules are applied to the artwork (e.g. 214) when still wet to the touch and is illustrated in the flowchart shown in FIG. 4. The terms "dry rolling" and "wet rolling" are terms coined by the inventor to describe the process and timing of the application of the painting globules 202 to either a canvas 216 or other adherable surface 218 to form one or more pieces of artwork 214.

FIG. 3 is a flowchart that describes an exemplary process for "dry rolling" the painting globules 202 in one or more non-limiting embodiments. The term "dry rolling" is meant to indicate that one or more painting globules are initially created by the artist or other entity and provided a sufficient amount of time to dry so that the outer layers are sufficiently dry before applying to the surface of a painting canvas 216 or other adherable surface 218. The painting globules 202 need to dry enough so that they can be handled and moved onto canvas 216 or another surface 218. Once the painting globules 202 are dry to the touch, the one or more painting globules 202 are adherable to the canvas 216 or other adherable surface 218. Accordingly, at step 302 in FIG. 3, the process for dry rolling may begin with the artist or another entity (e.g. a machine) mixing oil paint 204, gel painting medium 206, and resin glaze medium 208 to create a mixture for making one or more painting globules 202. As noted above, it is recommended that the desired amount is mixed on the surface of a paint palette, such as paint palette 212 or another mixing surface of choice.

At step 304, the painting globules 202 are rolled into shape. The artist may use a paint brush, such as paint brush 210 to roll the painting globules 202 or any other type of tool at step 304. The artist may remove the desired amount of the mixture to create the desired size for a painting globule 202. If the artist determines that the resulting painting globule needs fixing or adjusting, he or she (or another entity such as a machine or special tool) may continue to roll the painting globule until it has the sufficient level of roundness and/or size and texture as desired. It may be determined that additional amounts of color from oil paint 202 may need to be added to the resulting painting globule 202. It may also be determined that additional amounts of gel painting medium 204 or resin glaze medium 208 may need to be added to the resulting painting globule 202, in which case these components may be added using a paint brush, such as paint brush 210. Accordingly, the painting globule 202 may be re-rolled and shaped until the desired shape and size and texture is achieved.

Continuing at step 306, upon determining that the desired shape, size, and texture of the individual painting globule has been achieved, the painting globule 202 is removed from the paint brush 210 or other tool. To remove the paint globule 202, in one embodiment, the user can unroll the paint globule using a twisting motion of the paint brush 210 or other tool to drop the painting globule 202. The painting globule 202 may be dropped or place to one side of the paint palette 212 (or other mixing surface) and left to dry. Additionally, or alternatively, the painting globules 202 can be removed to a box or other container.

At this point (at step 308), the one or more painting globules are allowed to dry after being removed from the tip of the paint brush 210 or other tool. The painting globules 202 may be left to dry over a period of time such that at least one or more outer layers of the painting globules 202 are dry to the touch. The drying time of the painting globules 202 may vary depending on the size of the painting globule and the amount of each of the oil paint 204, gel painting medium 206, and resin glaze medium 208. The drying times may also vary depending on the color selection and type of oil paint 204. It is estimated for the outer layers of the painting globules 202 to be dry to the touch, it may take a range of one or more hours to dry. In order for all the inner layers of the painting globules 202 to dry completely, it may take a range of time, including days and weeks to fully dry so as to be completely dry Their final texture may be rather rubbery in texture.

Once the painting globule 202 is dry to the touch, then it may be applied to the surface of a canvas, such as canvas 216, or other adherable surface 218. Accordingly, at step 310, a miniscule amount of paint (e.g. a dot or a bit more of paint) may be applied to the surface of the canvas 216 or other adherable surface 218. In other embodiments, other types of adherable components may be used to adhere the painting globule 202 to the canvas 216, such as adhesives, fasteners, or some other means or components to attach the painting globule 202 to the canvas 216. Because the outer layer of the painting globules 202 should be dry (e.g. it has been allowed sufficient time to cure or dry at step 308), it is needed to use a drop or minuscule amount of paint to hold the painting globule 202 against the surface of the canvas 216 or other type of adherable surface 218. Subsequently, at step 312, a first painting globule 202 is applied over the deposited minuscule amount of paint and adhered in this manner to the canvas 216 or other adherable surface 216.

Next, at step 314, the process includes continuing to deposit a miniscule amount of paint or other adherable component and applying individually each painting globule 202 over the deposited paint in order to create the artwork having the desired final pattern and appearance and artistic design. To apply the formed painting globules 202 to the surface of the canvas 216 or other adherable surface, the artist may apply the painting globule 202 to the selected surface by contacting the surface (e.g. canvas 216 or other adherable surface 218) and fluidly rolling the paint brush 210 or other tool counter-clockwise to separate the painting globule from the paint brush 210 or other tool and onto the selected surface.

At step 316, the process may conclude, in one or more non-limiting embodiments, by allowing the entire piece of artwork 214 curing or drying time for the painting globules 202 and artwork as a whole to dry completely 316, including the inner layers of the painting globules 202. The amount of curing or drying time needed may vary depending on many factors, including, the size and scale of the artwork 214 on which the painting globules 202 are located, the amount and type of gel painting medium 206 used, as well as other factors that affect drying time, such as, without limitation, weather and surrounding environmental conditions.

Figure 7A:
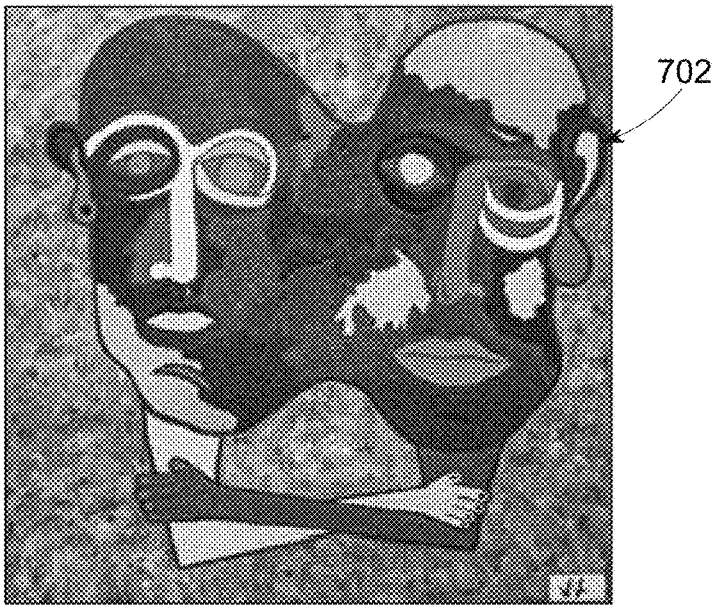
FIG. 7A is a pictorial illustration of a created piece of artwork entitled "Hugging" that uses the globulist technique in accordance with an illustrative embodiment.

The artist may apply the painting globules 202 in any order and combination of colors to create the ultimate desired artwork 214. The painting globules 202 can be used in any way to create any type of realistic or abstract imagery (e.g. as shown in FIG. 7A-FIG. 8 without limitation thereto). The process described in FIG. 3 may be used to create one or more painting globules 202 that are applied after having been rolled and formed and allowed some period of time to become relatively dry to the touch (e.g. at least the outer layer is dry to the touch).

Indeed, a unique advantage of the painting globules 202 is that they may be created and stored in a container for a period of time and left to dry or may be provided or sold in their dried stage. In one or more embodiments, painting globules 202 may be sold or otherwise provided in a kit, such as kit 216 shown in FIG. 2. A "kit" as used herein may refer to any type of packaging or container that may hold one or more painting globules, such as painting globules 202 or 220. When sold or otherwise provided for in kit 216, the painting globules may be pre-formed painting globules, such as pre-formed painting globules 220, that have been mixed, rolled, and set aside for a sufficient period of time to dry, and then packaged or located in kit 216. The pre-formed painting globules 220 of kit 216 may be formed from the mixture as noted above of oil paint 204, gel painting medium 206, and resin glaze medium 208 and function in accordance with all of the aspects and capabilities of painting globules 202. In one or more embodiments, they may have been mixed at a 3 to 1 to ½ ratio using the one or more processes described above. A user may purchase or otherwise obtain a kit such as kit 216 having one or more pre-formed painting globules 220 in an array of colors, sizes, and/or shapes in order for a user or purchaser to create his or her own piece of artwork 214. Advantageously, a user may not have time to individually mix and roll each of the painting globules 202 to be used for their artwork 214 and may choose to obtain a kit 216 and the pre-formed painting globules 220 instead.

In one or more embodiments, kit 216 may further include additional items that may be useful to include in kit 216. In one or more non-limiting embodiments, kit 216 may include useful tools, such as tools 222, which may include one or more paintbrushes of varying sizes. Tools 222 may further include other useful items such as a cleaning solution, rags or pieces of cloth, or other painting and/or artistic related tools without limitation to these listed items. Additionally, in one or more non-limiting embodiments, kit 216 may also include additional containers or samples of oil paint 204 in a variety of colors, as well as gel painting medium 206, and/or resin glaze medium 208 with instructions on how to mix these components to form additional painting globules 202 should the user so desire to do so. The user may adhere the pre-formed painting globules 220 to a canvas 216 or other adherable surface 218 using the dry rolling process described above with respect to FIG. 3. In particular, by applying a small amount of paint to the desired location on the surface of the artwork 214, the artist may then individually place each pre-formed painting globule 220 over each bit of paint to create the desired overall artwork 214.

In one or more non-limiting embodiment, the kit 216 may further include samples or pre-drawn artwork (not shown) having pre-printed images or patterns on which the user can place the pre-formed, dried painting globules 220. The sample may allow a user to engage with the technique of creating a globulist painting (e.g. such as paintings 702 and 802 shown in FIG. 7A and FIG. 8).

As noted above, the dried paint globule (e.g. 202 and 220) is very versatile and useful because its position may be moved around as desired by the artist on a canvas 216 or other adherable surface 218 without too much difficulty. The artist may adhere the dried paint globule 202 to any surface using the bit or miniscule of paint underneath to hold the dried paint globule 202 in contact with the underlying surface. In some cases, their application may include other alternative methods other than careful application using a paint brush, such as paint brush 210, or another tool, such as throwing or lobbing the dried paint globules 202 onto the surface of a canvas 216 or other adherable surface 218. Additionally, or alternatively, other application techniques may include stamping the paint globules 202 (when dried) onto the surface of a canvas 216 or other adherable surface 218. The artist is able to engage a great deal of creativity in the process of how to apply the painting globules 202 or 220 to the surface of the artwork 214.

Turning to FIG. 4, FIG. 4 is a flowchart providing an exemplary process for applying the painting globules directly to a canvas or other type of surface when the painting globules are still wet. The inventor has coined the term “wet rolling” to refer to this process of applying the rolled and formed painting globules 202 when one or more outer layers of the painting globules 202 are still wet or may not be dry to the touch, which is slightly different than the process described in FIG. 3. In FIG. 4, the process may begin at step 402, which includes mixing the oil paint 204, the gel painting medium 206, and a resin glaze medium 208 to create a mixture for making painting globules, such as painting globules 202. These components may be mixed together, in one or more non-limiting embodiments, in the 3 to 1 to ½ ratio described above and may be mixed on a paint palette 212 or another surface.

At step 404, the process may include removing from the mixture the desired amount of the mixture so as to form the painting globule 202 with the desired size and/or shape. At step 406, the artist or other entity rolls the desired amount of the mixture into one or more painting globules 202 using paint brush 210 or another type of tool to the desired shape and size in the manner described above. At step 408, the one or more formed painting globules are removed from the end of the paintbrush 210 or other tool as also noted above. At step 410, the one or more painting globules are applied directly to the canvas 216 or another surface 218 to create the artwork 212. In contrast with the steps of FIG. 3, in the wet rolling process described in FIG. 4, the painting globules 202 are applied to the canvas 216 or other surface 218 even if the one or more outer layers of the painting globules 202 are still wet and thus there is no need to apply a miniscule amount of paint on the canvas 216 or other surface 218 at the spot where each painting globule 202 is intended to be applied. To apply the formed painting globules 202 to the surface of the canvas 216 or other adherable surface, the artist may apply the painting globule 202 to the selected surface by contacting the surface (e.g. 216 or 218) and fluidly rolling the paint brush 210 or other tool counter-clockwise to separate the painting globule from the paint brush 210 or other tool and onto the selected surface. The artist may arrange the one or more painting globules in any type of order or arrangement to create the piece of artwork 214 having the final visual imagery and effect desired.

At step 412, in one or more non-limiting embodiments, the process may conclude with providing or allowing sufficient period of time for the one or more painting globules on the canvas 216 or other adherable surface 218 to dry. In some cases, the painting globules may be applied in sections while still wet in sections and allowed to dry and then other painting globules applied to other sections. Because the painting globules are still wet, it may be the case that the colors may bleed slightly together on the canvas 216 or other adherable surface 218. However, this effect may be desirable to the artist and may have the effect that the artist intends to convey. The paint will dry and the colors of the oil paint mixture in the painting globules 202 will become fixed in place.

For both processes illustrated in FIG. 3 and FIG. 4, the painting globules 202 are individually rolled and applied by the artist on the canvas 216 or other adherable surface 218. The artist may make several painting globules (oftentimes hundreds of painting globules or more) to create a piece of artwork 214 that portrays the desired scene or composition. The ultimate effect is a combination of the multiple painting globules 202 which from afar appear as a unified piece, but when the artwork 214 is approached and looked at more closely, provides a view of the hundreds of individual, generally spherical shaped painting globules of varying sizes and textures 202 (e.g. as shown in FIG. 1, FIG. 7A, and FIG. 8). The globulism technique has the ultimate effect of appearing very thick and the painting globules 202 are visibly raised from the painting surface (e.g. canvas 216 or other adherable surface 218). Further, the botryoidal shape of the painting globules 202 may appeal to many viewers.

It is noted that the steps of the processes as described with respect to FIG. 3 and FIG. 4 do not necessarily need to be performed in the listed order as in other embodiments, the steps of each process may be performed in an order alternative to that described above. Further, additional steps may be used in one or more methods.

It is also noted that an advantage of the globulist technique includes that an artist is not required to have the canvas 216 or other adherable surface 218 in a flat, horizontal position when positioning the formed painting globules 202 on these surfaces. It is very possible for the canvas 216 or other surface 218 to be in a vertical or generally upright orientation (e.g. on an easel or table or other surface) when the painting globules 202 are applied to the surface, whether the painting globules 202 are applied using the dry-rolling, globulism technique described in FIG. 3 or using the wet-rolling, globulism technique described in FIG. 4.

Turning to FIG. 5, FIG. 5 is a pictorial illustration of several painting globules, such as painting globules 202. As shown in FIG. 5, painting globules 202 are individually rolled, generally spherical globs or globules that are a mixture of oil paint 204, gel painting medium 206, and resin glaze medium 208. It is noted that many of the painting globules 202 are not exact spheres and may have more rounded edges than others.

As shown in FIG. 5, the painting globules 202 may come in an array of colors that range from red, green, blue, and any other color as desired based on the color of the selected oil paint 204. The painting globules 202 may be rolled to range in size, as shown in FIG. 5, such that painting globules 202 may range from very tiny globs to larger sized globes. If desired, the artist may utilize a measuring tool such as ruler 502 shown in FIG. 5 and FIG. 6 or the like to measure out desired sizes of the painting globules 202 while rolling and forming them. Different sized painting globules 202 may be needed by the artist to form the final image on their artwork 214.

FIG. 6 is a pictorial illustration that illustrates one of the unique advantages of the painting globules 202. As shown in FIG. 6, painting globules 202 may be stacked on top of one another to form a stack of one or more painting globules 202. Stack 602 is a stack of five painting globules that range in size from large to small. The painting globules 202 are stackable because they are formed into hardened globules that can be arranged as individual layers or multiple layers on a canvas 216 or other adherable surface 218.

One of the many advantages of using painting globules 202 is that their position may be manipulated easily because they can be picked up and placed wherever desired on either canvas 216 or another adherable surface 218, particularly once they are allowed to dry sufficiently so that one or more outer layers of the painting globules 202 is at least dry to the touch. One may pick up the painting globules 202 with various tools, such as a paint brush 210 (by adding a small amount of paint on the end of the paint brush 210 to adhere to one side of the paint brush 210), or with other tools such as tweezers or a pointed tool or even one's hands and place them as desired on either canvas 216 or another adherable surface 218 to create a piece of artwork 214. Further, as shown in FIG. 6, painting globules 202 are stackable and may be located in stacks of two or more painting globules 202 if desired on canvas 216 or other adherable surface 218.

It is noted that globulism and the painting globules (e.g. painting globules 202) that are used in globulism are unique in that the globulist technique may be considered to combine both painting and sculpture to some degree. The painting globules 202 have a three-dimensional, physical form as a sculpture piece or element used in a sculpture may have, but the painting globules 202 are also configured to create paintings and involve the use of paint rather than clay or another modeling element.

Figure 7B:
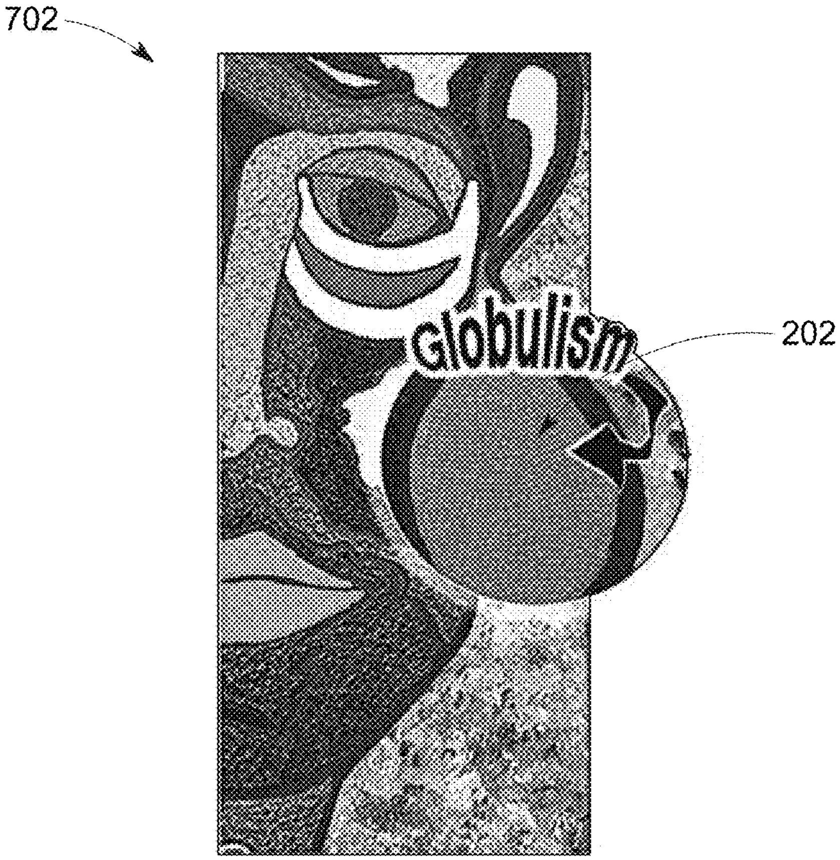
FIG. 7B is a pictorial illustration of a portion of the created piece of artwork in FIG. 7A that used the globulist technique in accordance with an illustrative embodiment.
Figure 8:
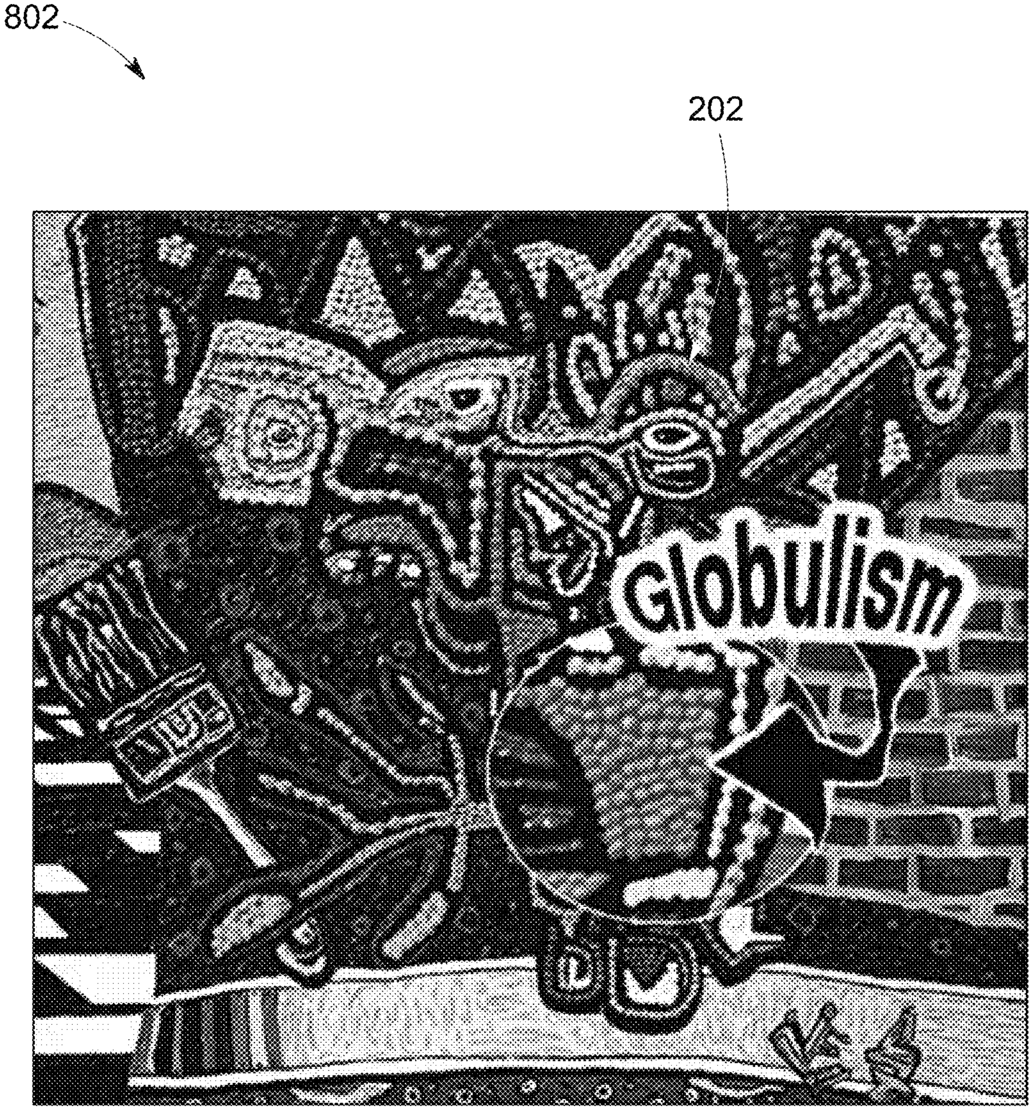
FIG. 8 is a pictorial illustration of a portion of a created piece of artwork entitled "The Globulist."

FIG. 7A, FIG. 7B, and FIG. 8 are pictorial illustrations of paintings that were created using one or more globulist methods described above. In particular, FIG. 7A is a pictorial illustration of painting 702 entitled "Hugging" and FIG. 8 is a pictorial illustration of another painting 802 entitled "The Globulist." FIG. 7B shows a portion of the painting 702 and highlights the globulist technique used to make painting 702.

Both paintings 702 and 802 as shown in FIGS. 7A-7B and FIG. 8 were created by the inventor using the invented globulist technique. Paintings 702 and 802 are the result of hundreds of painting globules 202 of various sizes and colors individually rolled, deposited onto the underlying canvas, and arranged to form the desired imagery and/or patterns of painting globules 202 as shown in painting 702 and painting 802. Because of the unique abilities offered to the artist when using painting globules 202 to form the painting, the paintings 702 and 802 each appears to have an easily visible three-dimensionality and the colors have great depth and pop. It has been said that the paintings 702 and 802 also are more visually appealing because of the use of the rounded painting globules 202 which have an interesting sculptural and visual appeal to the viewer.

Accordingly, one or more embodiments have been described in the present description that relate to a painting technique that has been recently created and is referred to as "globulism." Artists over the years have made various efforts and attempts to add three-dimensionality and texture using various techniques (e.g. impasto, blob art, dot art, etc.) to their paintings or other pieces of artwork. However, none of these existing techniques provide the unique capabilities offered by the globulist technique and do not equate to the globulist technique. In particular, painting globules 202 created by the globulist technique may be rolled and shaped having various sizes that may be held and positioned as desired, which other painting techniques do not provide. Further, the artist may easily change and manipulate the position of painting globules 202 while working on one's artwork 214. If a painting globule 202 is placed on a canvas and the artist wants to change its position, it may be relatively easy to move to another location (before the painting globule dries completely). These quick alterations and repositioning are not as easily achieved with brush strokes on a painting such as with impasto painting and other types of painting techniques that try to add three-dimensionality to a painting.

As noted above, another important advantage offered to an artist is that painting globules 202 can be applied without needing that a canvas, such as canvas 216, or other adherable surface 218 be positioned in a flat, horizontal orientation. Typically, with blob art or dot art or other similar types of painting techniques that involve three-dimensionality, the canvas has to be horizontal or flat because the colors are still very wet and are likely to bleed and run off of the canvas to a great extent. In contrast, even when painting globules 202 are applied to canvas 216 using the wet rolling method, there is minimal bleeding or running of colors of the painting globules 202 and an artist is able to keep the canvas 216 in a more vertical, upright orientation (e.g. may be located on an easel or held upright in another manner) when applying the painting globules 202 to the canvas 216 or other adherable surface 218.

Further, another one of the many advantages of the globulist technique not offered by other painting techniques, is that the painting globules 202 may be stored and left to dry in various containers and used when desired by an artist for their various art pieces at a later point in time. As noted above, in one or more embodiments, pre-formed and dried painting globules 220 that are in accordance with painting globules 202 may be made and provided in a kit 216 for use by individuals to create their artwork. Accordingly, the advantages of the painting globules are numerous. As noted above, the painting globules 202 may be applied to a canvas 216 or other surface 218 when wet or dry, which may provide different artistic effects and results. Accordingly, many creative and unique pieces of artwork may be created in a novel manner using the one or more embodiments of the globulism technique as described herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A method for creating artwork made from one or more painting globules and applying the one or more painting globules when dry, the method comprising:

mixing oil paint, gel painting medium, and a resin glaze medium to create a mixture for forming the one or more painting globules;

removing a desired amount of the mixture to form the one or more painting globules;

forming the one or more painting globules by rolling the removed desired amount of the mixture to form the one or more painting globules on a paint palette or other mixing surface, wherein each painting globule of the one or more painting globules has a generally rounded, spherical shape having a desired size and texture;

allowing the one or more painting globules a sufficient amount of time to dry in order for at least an outside layer of the one or more painting globules to become dry;

depositing an amount of paint or other adhering component on a canvas or other adherable component;

adhering the one or more painting globules to the canvas or other adherable surface by applying a first painting globule of the one or more painting globules onto the deposited amount of paint or other adherable component;

continuing to deposit the amount of paint or other adherable component and to individually apply each remaining painting globule to the canvas or other adherable surface, wherein the one or more painting globules are applied in a desired pattern and order to create the artwork; and allowing the canvas or other adherable surface a sufficient period of time for the one or more painting globules to dry.

2. The method of claim 1, wherein the rolling of the removed desired amount of the mixture is performed using a paintbrush or other tool.

3. The method of claim 2, wherein the one or more painting globules that are formed are removed from the paintbrush or other tool and set aside to dry.

4. The method of claim 1, wherein a ruler or other measuring tool is used to measure out a desired size of the one or more painting globules.

5. The method of claim 1, wherein the one or more painting globules are stackable over each other.

6. The method of claim 1, wherein the gel painting medium comprises turpenoid gel.

* * * * *